United States Patent
Long et al.

(10) Patent No.: US 12,510,531 B2
(45) Date of Patent: Dec. 30, 2025

(54) NANOPORE SINGLE-MOLECULE PROTEIN SEQUENCER

(71) Applicant: NANJING UNIVERSITY, Jiangsu (CN)

(72) Inventors: Yitao Long, Jiangsu (CN); Yilun Ying, Jiangsu (CN); Rujia Yu, Jiangsu (CN); Shaochuang Liu, Jiangsu (CN); Mengyin Li, Jiangsu (CN); Xinyi Li, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 654 days.

(21) Appl. No.: 17/915,494

(22) PCT Filed: May 19, 2021

(86) PCT No.: PCT/CN2021/094482
§ 371 (c)(1),
(2) Date: Sep. 29, 2022

(87) PCT Pub. No.: WO2021/209073
PCT Pub. Date: Oct. 21, 2021

(65) Prior Publication Data
US 2023/0221296 A1    Jul. 13, 2023

(30) Foreign Application Priority Data

Apr. 13, 2020 (CN) .......................... 202010287334.7
Oct. 28, 2020 (CN) .......................... 202011169556.5

(51) Int. Cl.
*G01N 33/487* (2006.01)
*G01N 27/447* (2006.01)
*G01N 33/68* (2006.01)

(52) U.S. Cl.
CPC . *G01N 33/48721* (2013.01); *G01N 27/44791* (2013.01); *G01N 33/6818* (2013.01)

(58) Field of Classification Search
CPC ......... G01N 33/48721; G01N 33/6818; G01N 27/44791
See application file for complete search history.

(56) References Cited

U.S. PATENT DOCUMENTS

2017/0233804 A1* 8/2017 Reid ...................... G16B 30/00
435/6.15

FOREIGN PATENT DOCUMENTS

| CN | 102890474 | 1/2013 |
|---|---|---|
| CN | 107109490 | 8/2017 |

(Continued)

OTHER PUBLICATIONS

"International Search Report (Form PCT/ISA/210) of PCT/CN2021/094482," mailed on Jul. 30, 2021, with English translation thereof, pp. 1-4.

(Continued)

*Primary Examiner* — Kathryn Elizabeth Limbaugh
(74) *Attorney, Agent, or Firm* — JCIPRNET

(57) ABSTRACT

The present invention provides a nanopore single-molecule protein sequencer, which mainly includes a nanopore array chip system, an ultra-low current detection system and a data processing and construction system; the chip mainly includes a chip of peptide charge screening, a chip of amino acid sequence reading based on a series of specific nanopores and the like, the design principle of which is as follows: a series of biological nanopores with amino acid targeted identification are designed according to properties such as hydrophilicity and hydrophobicity, polarity, and chargeability of amino acids, and characteristic ion flow signals of amino acids forming a protein to be detected in nanopore are (Continued)

obtained one by one; characteristic information of a protein sequence in each of the nanopores is acquired by an arrayed ultra-low current measurement system; a standard model peptide sequence information base is used for identifying, correcting, integrating and reading amino acid sequences.

16 Claims, 6 Drawing Sheets

(56) References Cited

FOREIGN PATENT DOCUMENTS

| | | |
|---|---|---|
| CN | 108279312 | 7/2018 |
| CN | 112480204 | 3/2021 |
| CN | 112578106 | 3/2021 |

OTHER PUBLICATIONS

"Written Opinion of the International Searching Authority (Form PCT/ISA/237) of PCT/CN2021/094482," mailed on Jul. 30, 2021, pp. 1-5.

* cited by examiner

NANOPORE SINGLE-MOLECULE PROTEIN SEQUENCER

CROSS-REFERENCE TO RELATED APPLICATION

This is a 371 application of the International PCT application serial no. PCT/CN2021/094482, filed on May 19, 2021, which claims the priority benefits of China Application No. 202010287334.7, filed on Apr. 13, 2020, and China Application No. 202011169556.5, filed on Oct. 28, 2020. The entirety of each of the above-mentioned patent applications is hereby incorporated by reference herein and made a part of this specification.

TECHNICAL FIELD

The present invention relates to the fields of biotechnology and medicine, and in particular to a multi-channel nanopore sequencing device that can directly, efficiently and accurately analyze and detect amino acid sequences of proteins and can be flexibly extended to equipment for sequencing and analyzing trace proteins or unknown proteins in a biological sample.

DESCRIPTION OF RELATED ART

Proteins maintain various vital processes of cells, and are one of the most important components of living organisms. Accurate determination of amino acid sequences of proteins in an organism is fundamental to understanding the biological functions of proteins. At present, the methods for protein sequencing are mainly Edman degradation sequencing and mass spectrometry. The Edman method is mainly used for analyzing the N-terminus of a protein, and the mass spectrometry includes searching for a specific fragmentation mode based on the regular fragmentation of a peptide fragment molecule after protein digestion in a mass spectrum, and obtaining the amino acid information of the peptide fragment and the post-translational modification information on the amino acid according to the mass difference between the mass spectra peaks. The mass spectrometry has higher reproducibility and reliability, but its detection principle is to determine the sequences of proteins by detecting the mass-to-charge ratio, which makes it difficult to directly determine amino acids with similar molecular weight or post-translational modification groups. In addition, this method relies on a database of known protein sequences recorded, which makes it difficult to directly and accurately obtain sequence information of proteins, particularly, difficult to determine the composition and sequences of unknown proteins. At present, there is still a lack of amplification methods for protein determination, so that the sequencing of some trace proteins is difficult to achieve.

The nanopore single-molecule analysis technology has advantages such as high detection sensitivity and no need of labeling. In recent years, nanopore sequencers have rapidly developed and have been gradually applied to commercial DNA sequencing, the basic detection principle of which is to separate electrolyte solutions in detection cells on both sides using a nano-membrane; embed nanopores on the membrane and apply electric potentials at both ends; to capture single molecules by nanopores in a bulk system, wherein the single molecules to be detected can interact with the nanopores and pass through the nanopores to generate blocked characteristic current signals; and further apply a pattern recognition algorithm to obtain the base sequences. Due to the properties such as complex composition and non-uniform charge of amino acids of protein molecules, the current nanopore technology cannot meet the requirement of protein sequencing.

In recent years, an Aerolysin nanopore with a unique natural confined structure has been developed, which is only 1 nm at its narrowest part, so that the sensitivity of biological nanopore detection is greatly improved, the retention time of amino acids in the nanopore can be effectively prolonged in the detection process of polypeptide molecules, and the differentiation of single charged amino acids in a single polypeptide molecule is achieved. Therefore, the spatial discrimination capability of single-molecule protein sequencing can be further improved by constructing a novel biological nanopore protein molecule on a sequencer. The current nanopore device can preliminarily achieve the discrimination of several simple amino acids, which is not yet sufficient for the effective identification of 20 amino acids and their post-translational modifications, and it is difficult to obtain amino acid sequence information.

The main challenges for developing a nanopore single-molecule protein sequencing device are as follows: (1) there is an urgent need to further develop a highly sensitive and specific nanopore chip to achieve the single-molecule discrimination of different amino acids, and to build a multi-channel detection system to achieve the direct sequencing of unknown proteins; (2) the current nanopore data acquisition device cannot achieve the discrimination of ultra-low current signals (<pA), and is difficult to achieve the simultaneous multi-channel detection.

Aiming at those challenges, the present invention designs a series of chips that can be used for protein sequencing, mainly including a protein unfolding chip, an amino acid electrical screening chip, an amino acid sequence reading chip based on a specific nanopore and the like, constructs different biological nanopores with amino acid targeted identification function on the chips, and performs the parallel multi-channel processing in combination with an ultra-low current measurement system to finally achieve the electrochemical direct determination of amino acid sequences. Furthermore, the total capacitance of an input circuit is reduced, the noise of the measurement system is suppressed, and the signal-to-noise ratio of the measurement signals of parallel nanopores is improved through an integrated array amplifier, so that the high time-resolution and high current-resolution measurement of each nanopore is achieved; a big data analysis system for nanopore protein sequencing is developed, and a standard nanopore model peptide sequence information base is used for identifying, correcting, integrating and reading amino acid sequences. The present invention develops a rapid and low-cost protein sequencer to achieve the accurate analysis of protein molecules at a single-molecule level, and provide a novel rapid analysis instrument for the development of biomedicine and the field of life science.

SUMMARY

The technical problem to be solved by the present invention is to provide a nanopore single-molecule protein sequencer based on a multi-channel protein analysis chip with biological nanopores to achieve the direct and accurate sequencing of protein molecules at a single-molecule level.

In order to solve the above technical problem, the present invention provides the following technical scheme: a nanopore single-molecule protein sequencer, which mainly includes a nanopore array chip system, an ultra-low current detection system and a data processing and construction system. Specifically, the nanopore array chip system is designed as embedding a plurality of novel biological nanopores into an array chip to accurately discriminate 20 different amino acids, thus achieving the single-molecule sequencing of a protein molecule; the ultra-low current detection system is an arrayed parallel electrochemical measurement system that can achieve picoampere-level current resolution and microsecond-level time resolution; and the data processing and construction system is configured for establishing a corresponding relationship between current signals of a single protein molecule and different amino acids, thus achieving the single-molecule sequencing of a protein molecule.

Furthermore, the nanopore array chip system includes at least four types of chips, including 1 "chip of peptide charge screening" 201, 4 "chips of orthogonal identification of amino acids" 202, 1 "optical perturbation chip" 203 and 1 "alternating-current perturbation" chip 204;
- a) array detection micro-cells are separately constructed on the chips, and the detection micro-cells on the four types of chips are arrayed and can be 4×4, 4×6, 2×2 and 2×2, respectively; different precisely designed high-sensitivity biological nanopores are assembled on the detection micro-cells to achieve sequencing of 20 different amino acids, biological nanopores with amino acid targeted identification are designed and selected mainly according to properties such as hydrophilicity and hydrophobicity, polarity, and chargeability of the amino acids, sensitive domains aiming at different types of amino acids or post-translational modification groups are constructed in the nanopores, and the interaction time of a target amino acid to be detected with the nanopores is prolonged through the interaction of the target amino acid to be detected with a specific target site of the nanopores, so that a characteristic ion flow signal of the target amino acid to be detected in the nanopores is obtained;
- b) each of the detection micro-cells is composed of a supporting layer, an ultra-low current induction layer and a chip layer;
- c) a separate planar micro-electrode is arranged at the bottom of the body of each of the detection micro-cells, and is directly connected to a detection end of an amplifier through a printed wire;
- d) a sample to be detected is allowed to sequentially enter the four types of chips through a micro-fluidic system for determination and analysis; and
- e) after flowing through the chip of peptide charge screening, the sample to be detected can be determined for chargeability according to the difference of electric signals, and selectively enters one of the "chips of orthogonal identification of amino acids" to achieve the identification of a single amino acid.

Furthermore, the ultra-low current detection system at least includes a Multi-channel ultra-low current amplification and measurement system, a Multi-channel ultra-low current control system and a Signal acquisition and transfer system;
- a) the ultra-low current amplification and measurement system mainly includes a preamplifier circuit, a signal conditioning circuit and a low-pass filter;
- b) the preamplifier circuit can be designed as converting pA-level current signals into mV-level voltage signals using a high-performance operational amplifier (OPA) with CMOS buffered input or a system-on-chip (SOC) design based on a resistance feedback principle, and an arrayed ultra-low current amplifier circuit with a plurality of preamplifier circuits is designed and constructed;
- c) the signal conditioning circuit can be designed as performing signal conditioning control in terms of both noise source suppression and bandwidth compensation, and a highly integrated array detection chip designed therefrom, by reducing the area of a phospholipid membrane and the area of electrodes, removing electrode wiring and optimizing a preparation method for array electrodes, reduces the total capacitance (including membrane capacitance, liquid connection capacitance between an electrode and a solution, wiring capacitance of array electrodes, and the like) of an input circuit;
- d) the low-pass filter can be used for filtering out high-frequency signals higher than a cut-off frequency, and an active $8^{th}$-order Bessel low-pass filter can be used for noise reduction on analog signals acquired by the amplifier circuit;
- e) the Multi-channel ultra-low current control system can select the optimal nanopore in each set of "membrane-pore" systems in real time, and simultaneously acquire a current readout of each nanopore on each chip by designing an array selector and a microcontroller; and
- f) the Signal acquisition and transfer system mainly converts an analog signal after passing through the filter into a digital signal using an analog digital converter (ADC).

Furthermore, the data processing and construction system mainly analyzes and processes digital signals acquired by the orthogonal nanopore array chips and the ultra-low current measurement system, and obtains amino acid sequence information of a protein based on a hidden Markov machine learning model. In a process of analyzing a sequence of a single protein, firstly, time domain and frequency domain information of ion flow electric signals are extracted through machine learning, and first-order analysis is performed on the ion flow electric signal of a single protein to be detected, that is, the ion flow electric signal and frequency information obtained by frequency perturbation analysis are compared with information of a model protein sequencing database, so that preliminary sequence of the single protein is decoded, and then second-order analysis is performed on sequencing information of the protein, and sequence information is subjected to random mutation correction, so that the accurate sequence of the single protein is obtained.

The present invention has the following beneficial technical effects.

By designing a nanopore array chip and a ultra-low current detection system and constructing a data analysis and processing method, the present invention develops a nanopore single-molecule protein sequencer that can achieve the resolution of single amino acid identification and meet the requirement of protein molecule sequencing. The single-molecule discrimination of 20 amino acids is achieved through the screening of a specific biological nanopore and the preparation of an array chip; to further reduce the total capacitance of an input circuit and suppress the interference to multi-channel electric signal measurement, a multi-channel and low-noise ultra-low current measurement system is developed to achieve parallel recording of nanopore current on each chip with high time resolution and current resolution; a data analysis and processing method of "two-stage step-by-step analysis" of a protein sequence is proposed, which intelligently decodes amino acid sequence information to achieve the accurate analysis of a sequence of a single protein. The present invention can directly and quickly read ion flow signals when a protein molecule to be detected passes through nanopores to achieve the direct reading of amino acid sequences without further purification and enrichment of the molecules to be detected.

DESCRIPTION OF THE EMBODIMENTS

Figure 1:
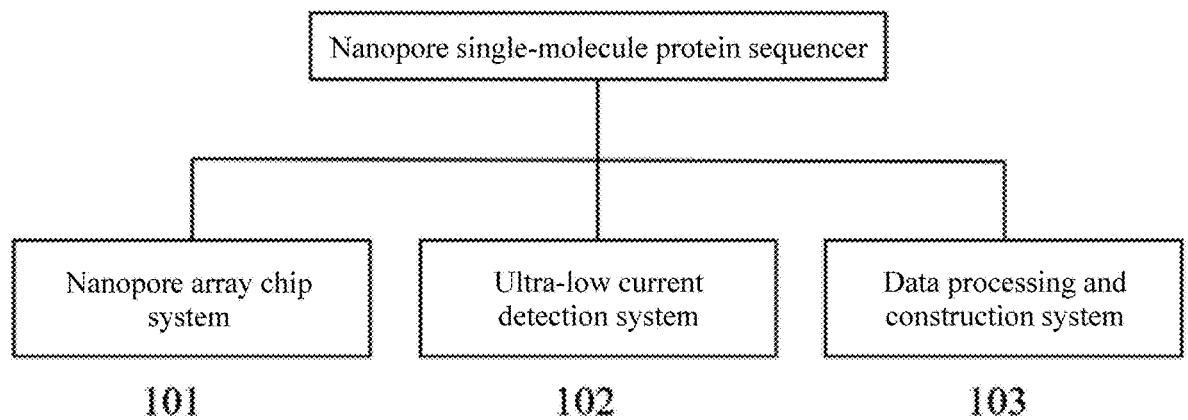
FIG. 1 is a general technical route of a nanopore single-molecule protein sequencer.

A preferred embodiment of the nanopore single-molecule protein sequencer of the present invention are described in detail below with reference to the drawings. As shown in FIG. 1, the general technical route of the nanopore single-molecule protein sequencer of the present invention includes a nanopore array chip system 101, a ultra-low current detection system 102, and a data processing and construction system 103.

Figure 2:
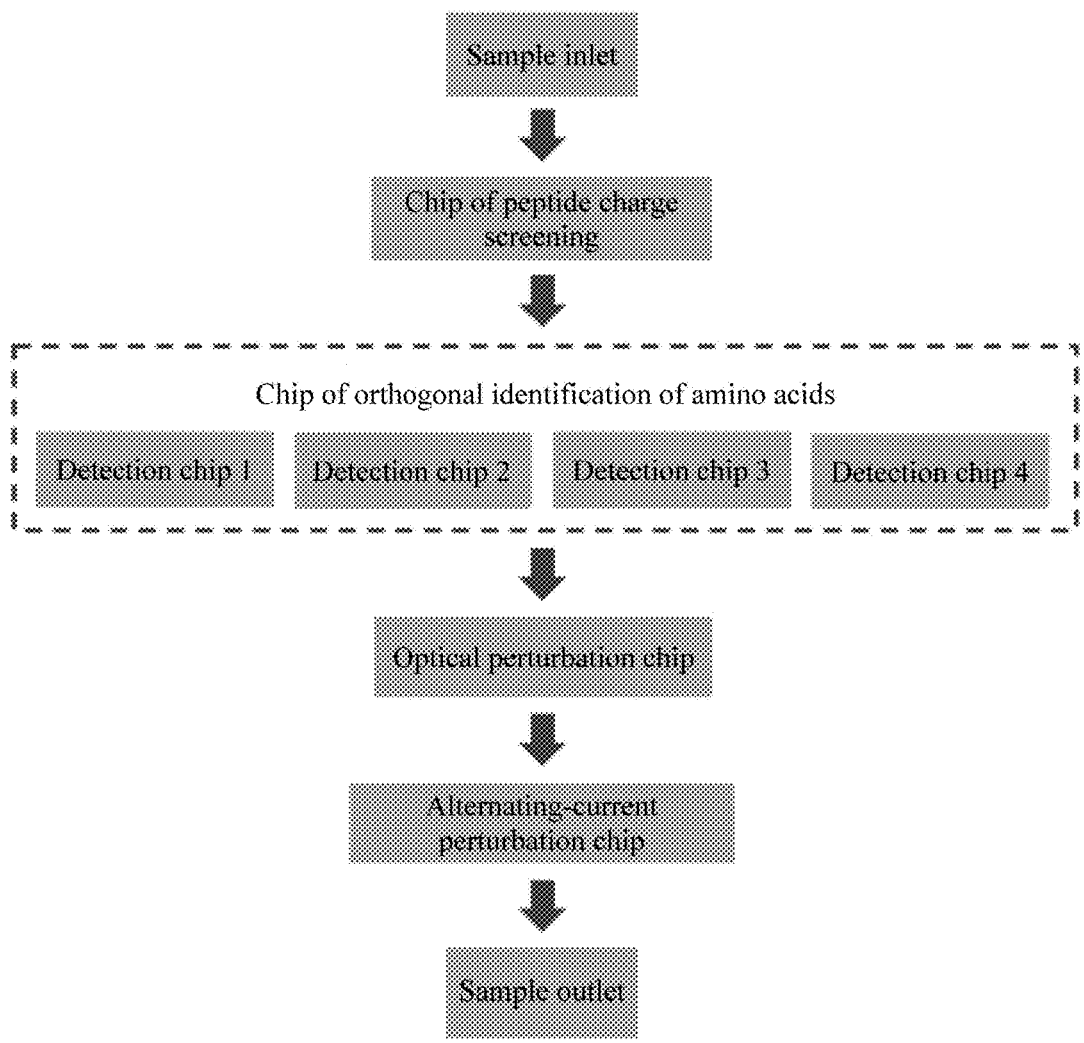
FIG. 2 is a schematic diagram showing a working route of a nanopore array chip system.

The nanopore array chip system 101 includes 1 "chip of peptide charge screening" 201, 4 "chips of orthogonal identification of amino acids" 202, 1 "optical perturbation chip" 203 and 1 "alternating-current perturbation chip" 204. The working principle of the nanopore array chip system is shown in FIG. 2: in each single-molecule protein sequencing, a single molecule to be detected needs to pass through an "chip of peptide charge screening" containing at least 4 polypeptide electrical primary screening nanopores, then selectively passes through one of the "chips of orthogonal identification of amino acids" to perform parallel amino acid orthogonal identification according to the electrical characteristics of the polypeptide, and then further passes through the "chips of orthogonal identification of amino acids", the "optical disturbance chip", and the "alternating-current perturbation chip" to achieve the accurate identification of each amino sequence.

The "chip of orthogonal identification of amino acids" at least contains 4 chips aiming at negatively charged polypeptides, positively charged polypeptides, electrically neutral polypeptides with positive and negative charges shielded from each other, and electrically neutral polypeptides with positive and negative charges separated, respectively; each detection chip should contain at least 6 specific mutant Aerolysin nanopores for "orthogonal identification of amino acid", through which polypeptide sequence information is read in parallel and orthogonality.

Figure 3:
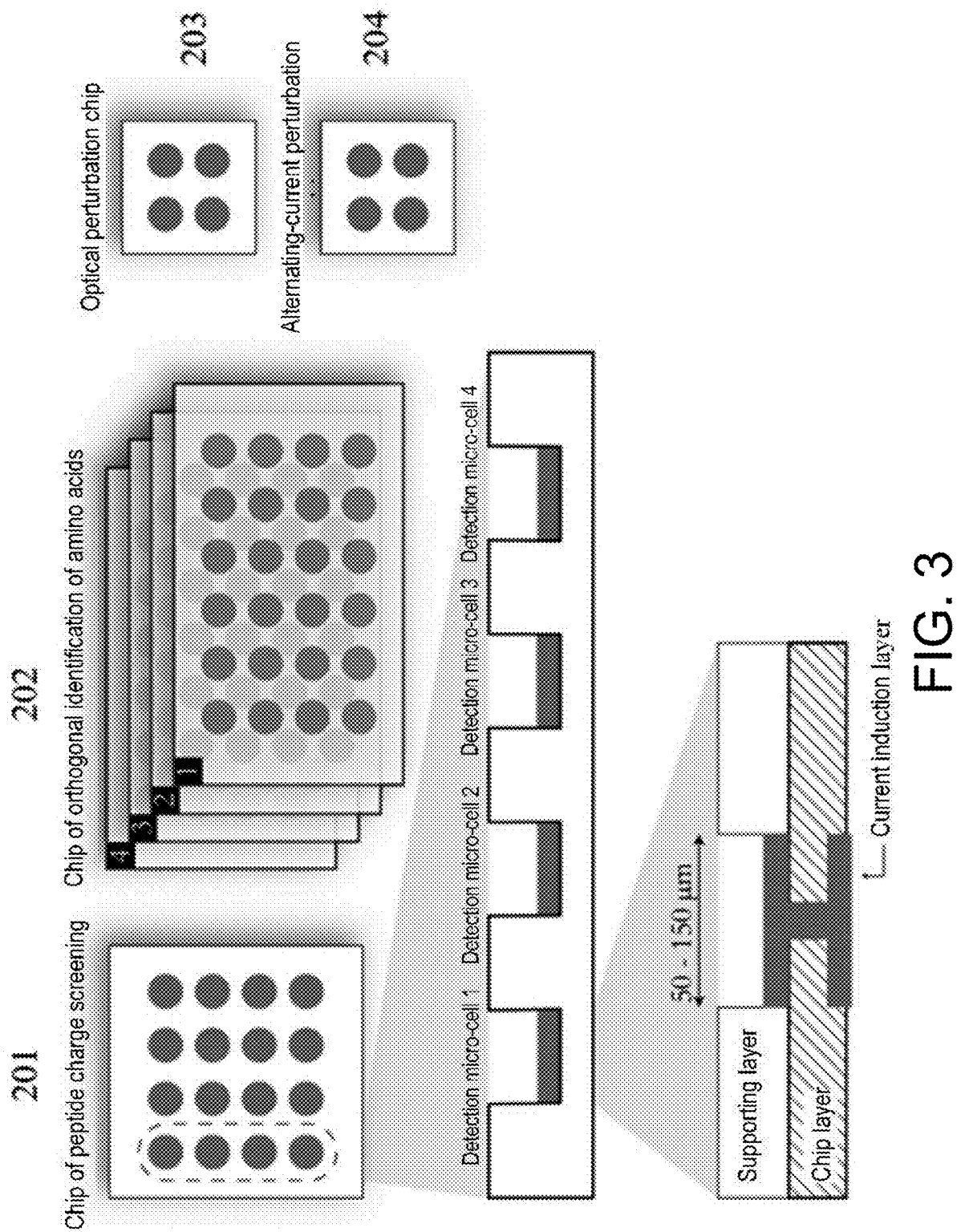
FIG. 3 is a schematic diagram showing an array chip system of the sequencer of the present invention.
Figure 4:
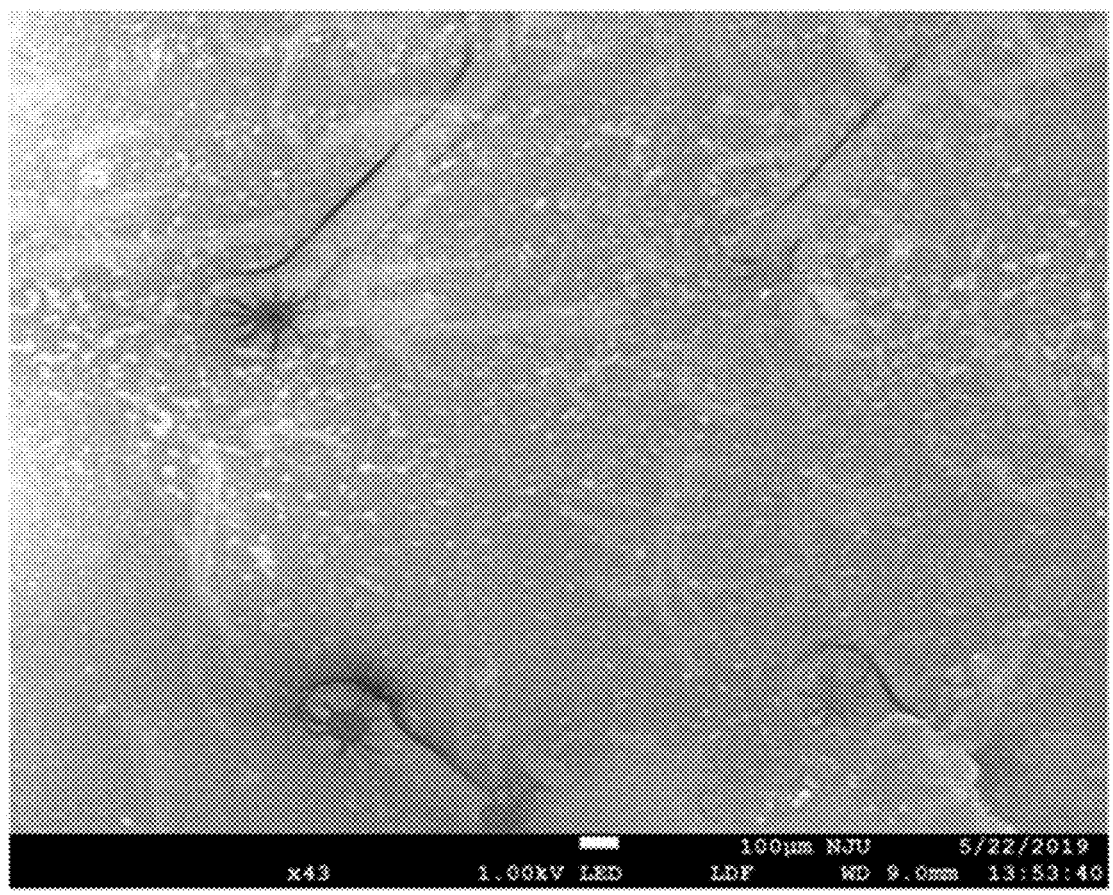
FIG. 4 is an SEM (scanning election microscopy) micrograph of an array micro-cell.

On the above four types of chips, 4×4, 6×4, 2×2 and 2×2 array detection micro-cells are constructed, respectively. As shown in FIG. 3, the diameter of a detection micro-cell containing a single biological pore is about 50-150 μm, with an SEM micrograph as shown in FIG. 4, and a separate planar micro-electrode is arranged at the bottom of the cell body, and is directly connected to a detection end of an amplifier through a printed wire, in order to avoid mutual electromagnetic signal interference caused by the layout of wires.

Each of the detection micro-cells is composed of a supporting layer, a ultra-low current induction layer and a chip layer.

A phospholipid bilayer is formed in each of the detection micro-cells to construct a single biological nanopore, thus enabling parallel recording of multi-channel currents. The system can maintain an independent current signal recording unit for each phospholipid bilayer, and has the scalability of cascading a plurality of chips.

The method for constructing nanopores on an array chip specifically includes the following steps: utilizing a microfluidic membrane forming mode, that is, filling a buffer solution in advance, filling a small amount of phospholipid solution (μL) into each channel through a sample injection pump, and then immediately filling the buffer solution, to form a "water-oil-water" interface in a micro-fluidic pipeline; allowing the formed interface to slowly (μL/s) flow through a supporting layer of each detection micro-cell through a peristaltic pump, and forming a phospholipid membrane (bilayer) with a thickness of 5 nm in a self-excitation mode based on the bipolar characteristic of phospholipid molecules, to provide an artificial cell membrane environment for the nanopores. On the basis of the constructed array cell paved with phospholipid bilayers, a biological nanopore protein solution is injected, so that the pore protein membrane embedding behavior conforming to Poisson distribution is achieved on a chip, and a stable single "membrane-pore" detection unit is provided for the detection of a single protein molecule.

Furthermore, a "membrane-pore" system detector is designed and prepared, that is, every four detection cells correspond to a high-precision current amplifier, so that the self-assembly performance of a single biological nanopore is determined by detecting the opening current of each "membrane-pore" system, and the optimal biological nanopore system is selected.

Figure 5:
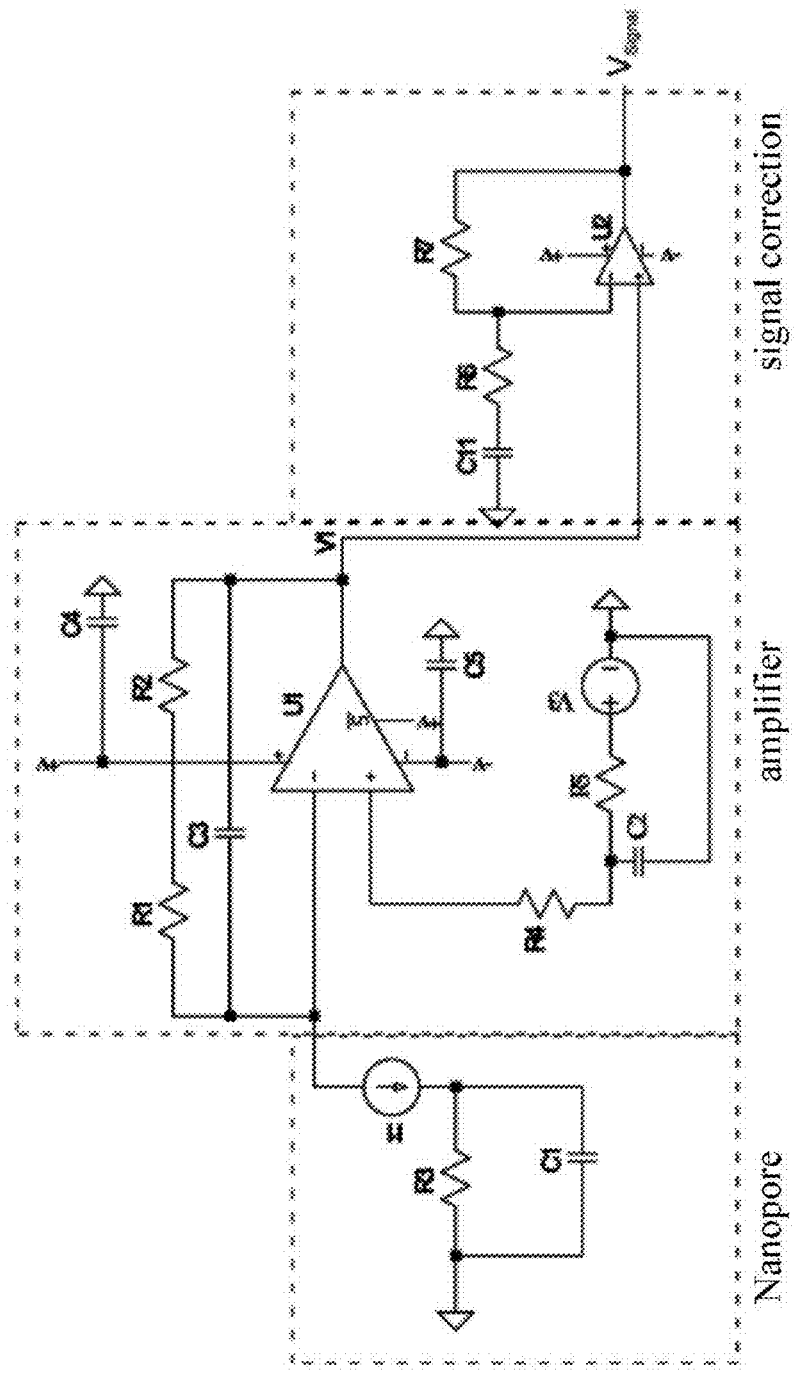
FIG. 5 is a single preamplifier circuit design.
Figure 6:
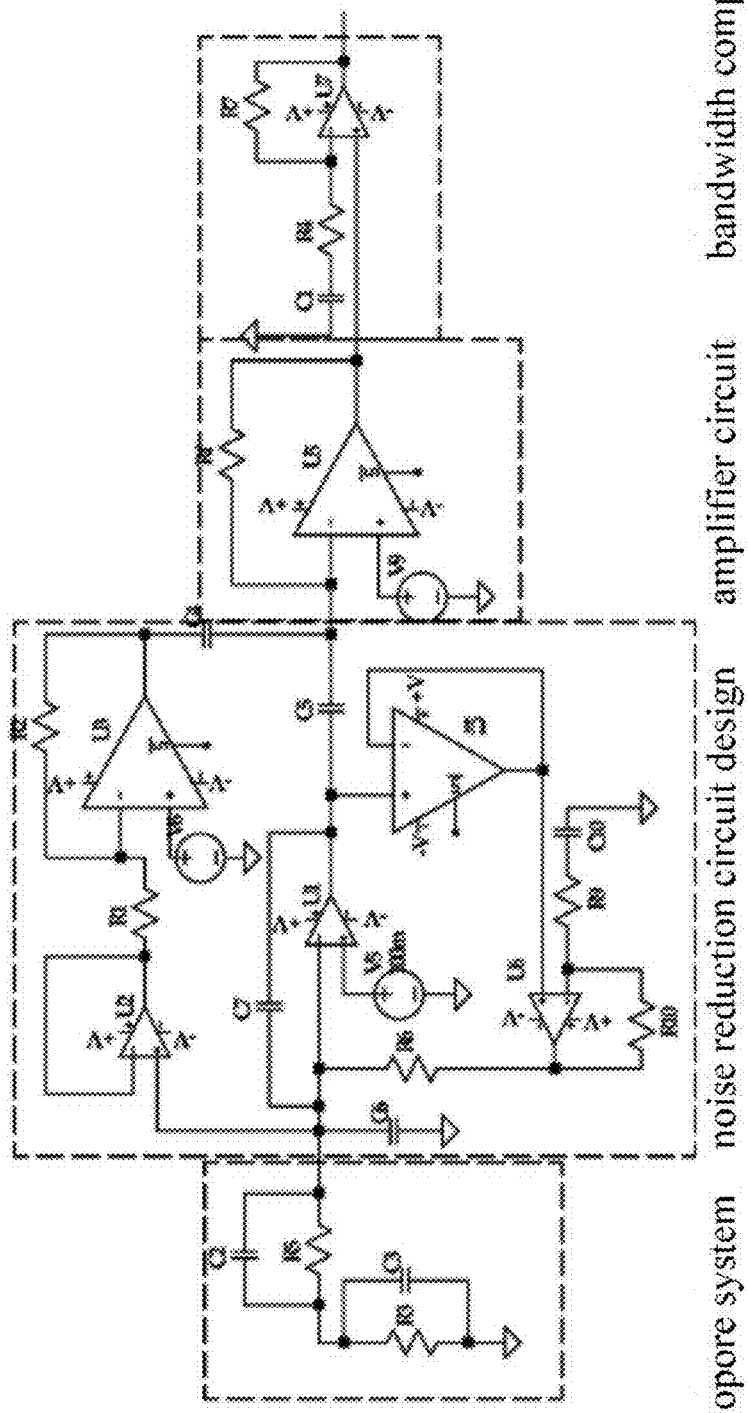
FIG. 6 is a single signal conditioning circuit design.
Figure 7:
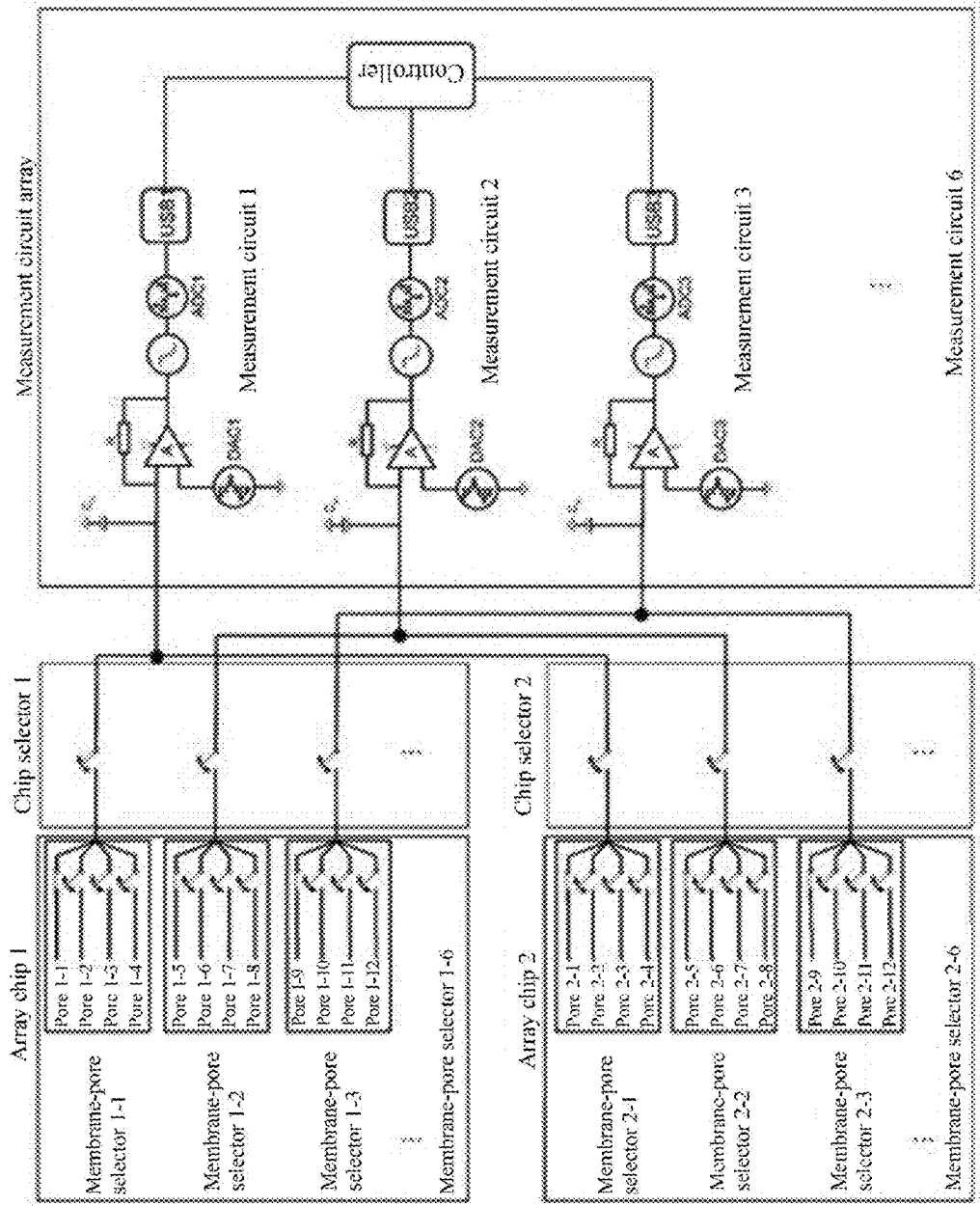
FIG. 7 is an arrayed ultra-low current control system design.

The ultra-low current detection system 102 includes a Multi-channel ultra-low current amplification and measurement system, a Multi-channel ultra-low current control system, and a Signal acquisition and transfer system. The Multi-channel ultra-low current amplification and measurement system adopts the principle of trans-impedance amplifier to achieve the high-precision measurement of pA-level current, and utilizes the frequency compensation technology to improve the time resolution of signal measurement to achieve accurate reading of current signals; the Multi-channel ultra-low current control system is mainly composed of a multiplexer switch (chip) and an array filter network, and is designed as performing processing such as selection and noise reduction on signals from the Multi-channel ultra-low current amplification and measurement system; and the Signal acquisition and transfer system quantifies the selected signals into digital signals, and performs high-speed data transmission with a PC (personal computer) terminal through a micro control chip such as an FPGA by utilizing high-speed data transmission protocols such as USB and FIFO, as shown in FIGS. 5-7, the data processing and construction system 103 mainly processes the ion flow signals acquired by the ultra-low current detection system 102 to obtain amino acid sequence information. The ion flow difference generated by a single amino acid in a nanopore analysis system is generally at the picoampere (pA) level, and will introduce measurement noise, environmental noise, array electric signal crosstalk and the like in the signal acquisition process. In the data processing by the sequencer, the noise reduction preprocessing is performed on current signals to further reduce the noise of a characteristic ion flow electric signal of the amino acid that has comparable amplitude and frequency band coincidence with the sequence signal, and improve the signal-to-noise ratio of the characteristic ion flow electric signal. Then, the time domain and frequency domain information of the ion flow electric signal obtained from an "orthogonal identification nanopore" and a "perturbation amplification nanopore" are extracted through machine learning using a model protein, to establish a model protein single-molecule sequencing feature database. In a process of analyzing a sequence of a single protein, first-order analysis is performed on a series of parallel "signature" ion flow electric signals of a single protein to be detected, that is, the ion flow electric signals and the information of the model protein sequencing database are subjected to amino acid identification using a hidden Markov model, so that preliminary sequence of the single protein sequence is decoded and read, and then polypeptide sequencing information is subjected to further random mutation correction through frequency perturbation analysis, so that the accurate sequence of the single protein is obtained.

When the nanopore single-molecule protein sequencing instrument system is used for protein sequencing, the single-molecule sequencing of a polypeptide molecule with random amino acid sequences is taken as an example. Firstly, different nanopores are constructed on a chip, the polypeptide molecule to be detected is injected into a detection cell through a micro-fluidic technology, and voltage (−300 mV to +300 mV) is applied to both ends of the detection cell to drive the polypeptide molecule to pass through the nanopores. An ion flow signal of the polypeptide molecule passing through the nanopores is recorded and acquired by a ultra-low current detection system, since ion flow blocking signals caused by 20 amino acids are different through a series of detection chips and correction, the 20 amino acids are differentiated by recording the ion flow blocking signal corresponding to each of the amino acids in combination with the data processing and construction system, so that the single-molecule sequencing of the polypeptide molecule to be detected is achieved.

In the present invention, a use of the nanopore single-molecule protein sequencer in protein sequencing, including the following specific steps: firstly, a protein sample to be detected is unfolded by temperature or pH regulation means, and the N-terminus of a polypeptide is labeled with a specific peptide nucleic acid or fluorophore and is taken as a starting point for sequencing, and then the peptide nucleic acid labeled sample or the fluorophore labeled sample is added into a sample inlet of the protein sequencer, allowed to flow through the chip of peptide charge screening, the chip of orthogonal identification of amino acids, the optical perturbation chip and the alternating-current perturbation chip sequentially through a micro-fluidic system, and an electrochemical signal is captured by the ultra-low current detection system of the sequencer, finally, the accurate amino acid sequence of the protein is analyzed using the data processing and constructing system.

In the present invention, the array chip system refers to a combination of several different chips, and is not limited to the above "chip of peptide charge screening", "chip of orthogonal identification of amino acids", "optical perturbation chip" and "alternating-current perturbation chip".

In the present invention, after flowing through the "chip of peptide charge screening" through a micro-fluidic system, the sample to be detected can be determined for chargeability according to the difference of electric signals, and selectively enters one of the "chips of orthogonal identification of amino acids" to perform specific amino acid identification, and then passes through the "optical perturbation chip" and the "alternating-current perturbation" chip sequentially.

In the present invention, the "chip of peptide charge screening", "chip of orthogonal identification of amino acids", "optical perturbation chip" and "alternating-current perturbation chip" may be an array of 4×4, 4×6, 2×2, 2×2 (or other similar array chips) chips, but are not limited to the above array, and can be further extended.

In the present invention, the nanopore is formed with biological nanopore materials, including aerolysin, α-hemolysin (αHL), MspA, phi29, and other biological nanopores, and mutants thereof, such as aerolysin mutants K238Q and N226Q.

In the present invention, in terms of chip structure processing, the supporting layer may be mainly formed with materials, including but not limited to, negative photoresist (such as SU-8 and AZ series), and semiconductor materials (silicon, silicon nitride, etc).

In the present invention, the nanopore array chip system, the ultra-low current detection system, and the data processing and construction system can be highly integrated or modularized.

In the present invention, the developed ultra-low current detection system may be a module of the nanopore single-molecule protein sequencer, or may be built in existing nanopore measurement devices, such as the nanopore sequencer from Oxford Nanopore Technologies and Orbit 16 from Nanion Technologies.

The above description is only a preferred embodiment of the present invention and is not intended to limit the present invention. It is apparent that those skilled in the art can make various modifications and variations to the present invention without departing from the spirit and scope of the present invention. Thus, if such modifications and variations to the present invention fall within the scope of the claims of the present invention and their equivalents, the present invention is also intended to include such modifications and variations.

What is claimed is:

1. A nanopore single-molecule protein sequencer, comprising a nanopore array chip system, an ultra-low current detection system and a data processing and construction system, wherein the nanopore array chip system comprises a chip of peptide charge screening, a chip of orthogonal identification of amino acids, an optical perturbation chip and an alternating-current perturbation chip; the ultra-low current detection system comprises a Multi-channel ultra-low current amplification and measurement system, a Multi-channel ultra-low current control system and a Signal acquisition and transfer system; the data processing and constructing system is configured to analyze and process digital signals obtained by chips of arrayed parallel orthogonal nanopores and the ultra-low current detection system, and obtain amino acid sequence information of a protein based on a hidden Markov machine learning model.

2. The nanopore single-molecule protein sequencer according to claim 1, wherein the nanopore array chip system comprises 1 chip of peptide charge screening, 4 chips of orthogonal identification of amino acids, 1 optical perturbation chip and 1 alternating-current perturbation chip.

3. The nanopore single-molecule protein sequencer according to claim 1, wherein the chip of orthogonal identification of amino acids consists of 4 chips aiming at negatively charged polypeptides, positively charged polypeptides, electrically neutral polypeptides with positive and negative charges shielded from each other, and electrically neutral polypeptides with positive and negative charges separated, respectively, and each chip of the 4 chips of orthogonal identification of amino acids should contain at least 6 specific mutant Aerolysin nanopores for orthogonal amino acid identification, through which polypeptide sequence information is read in parallel and orthogonality.

4. The nanopore single-molecule protein sequencer according to claim 3, wherein array detection micro-cells are separately constructed on the chips in the nanopore array chip system, and the detection micro-cells on four types of different chips, namely the chip of peptide charge screening, the chip of orthogonal identification of amino acids, the optical perturbation chip and the alternating-current perturbation chip, are arrayed, and are 4×4, 4×6, 2×2 and 2×2, respectively; different biological nanopores are assembled on the detection micro-cells to achieve sequencing of 20 different amino acids, biological nanopores with amino acid targeted identification are designed and selected according to hydrophilicity and hydrophobicity, polarity, and chargeability of the amino acids, sensitive domains aiming at different types of amino acids or post-translational modification groups are constructed in the nanopores, and the interaction time of a target amino acid to be detected with the nanopores is prolonged through the interaction of the target amino acid to be detected with a specific target site of the nanopores, so that a characteristic ion flow signal of the target amino acid to be detected in the nanopores is expected to be obtained.

5. The nanopore single-molecule protein sequencer according to claim 4, wherein each of the detection micro-cells is composed of a supporting layer, an ultra-low current induction layer and a chip layer.

6. The nanopore single-molecule protein sequencer according to claim 4, wherein a separate planar micro-electrode is arranged at the bottom of the body of each of the detection micro-cells, and is directly connected to the ultra-low current detection system through a wire.

7. The nanopore single-molecule protein sequencer according to claim 1, wherein the ultra-low current amplification and measurement system comprises a preamplifier circuit, a signal conditioning circuit and a low-pass filter.

8. The nanopore single-molecule protein sequencer according to claim 7, wherein the preamplifier circuit is designed as converting pA-level current signals into mV-level voltage signals using a high-performance operational amplifier with CMOS buffered input or a system-on-chip design based on a resistive feedback principle.

9. The nanopore single-molecule protein sequencer according to claim 7, wherein the signal conditioning circuit is configured to perform signal conditioning control in terms of both noise source suppression and bandwidth compensation, and a highly integrated array detection chip designed therefrom, by reducing the area of a phospholipid membrane and the area of electrodes, removing electrode wiring and optimizing a preparation method for array electrodes, reduces the total capacitance of an input circuit, comprising membrane capacitance, liquid connection capacitance between an electrode and a solution, and wiring capacitance of array electrodes.

10. The nanopore single-molecule protein sequencer according to claim 7, wherein the low-pass filter is configured to filter out high-frequency signals higher than a cut-off frequency, and wherein the low-pass filter is an active $8^{th}$-order Bessel low-pass filter configured to reduce noise of analog signals acquired by the preamplifier circuit.

11. The nanopore single-molecule protein sequencer according to claim 7, wherein the Multi-channel ultra-low current control system selects the optimal nanopore in each set of membrane-pore systems in real time, and simultaneously acquires a current readout of each nanopore on each chip by designing an array selector and a microcontroller, wherein the array selector can be positioned between the preamplifier circuit and the array nanopore.

12. The nanopore single-molecule protein sequencer according to claim 10, wherein the Signal acquisition and transfer system converts an analog signal after passing through the filter into a digital signal using an analog-to-digital converter.

13. The nanopore single-molecule protein sequencer according to claim 1, wherein the data processing and construction system mainly analyzes and processes digital signals acquired by the orthogonal nanopore arrayed chips and the ultra-low current detection system, and obtains amino acid sequence information of a protein based on a hidden Markov machine learning model; in a process of analyzing a sequence of a single protein by the system, firstly, time domain and frequency domain information of ion flow electric signals are extracted through machine learning, and first-order analysis is performed on the ion flow electric signal of a single protein to be detected, that is, the ion flow electric signal and frequency information obtained by frequency perturbation analysis are compared with information of a model protein sequencing database, so that preliminary sequence of the single protein is decoded, and then second-order analysis is performed on sequencing information of the protein, and sequence information is subjected to random mutation correction, so that the accurate sequence of the single protein is obtained.

14. The nanopore single-molecule protein sequencer according to claim 4, wherein a phospholipid bilayer is formed in each of the detection micro-cells, and the biological nanopore is constructed in the phospholipid bilayer; each of the detection micro-cells has an independent system for forming a phospholipid bilayer to construct a single biological nanopore, so that different types of biological nanopores can be constructed.

15. The nanopore single-molecule protein sequencer according to claim 4, wherein the biological nanopore is formed with materials, comprising aerolysin, α-hemolysin, MspA or phi29 biological nanopore, and mutants thereof.

16. Use of the nanopore single-molecule protein sequencer according to claim 1 in protein sequencing, comprising the following specific steps: firstly, a protein sample to be detected is unfolded by temperature or pH regulation means, and the N-terminus of a polypeptide is labeled with a specific peptide nucleic acid or fluorophore and is taken as a starting point for sequencing, and then the peptide nucleic acid labeled sample or the fluorophore labeled sample is added into a sample inlet of the protein sequencer, allowed to flow through the chip of peptide charge screening, the chip of orthogonal identification of amino acids, the optical perturbation chip and the alternating-current perturbation chip sequentially through a micro-fluidic system, and an electrochemical signal is captured by the ultra-low current detection system of the sequencer, finally, the accurate amino acid sequence of the protein is analyzed using the data processing and constructing system.

* * * * *